US012645008B2

(12) United States Patent
Li et al.

(10) Patent No.: US 12,645,008 B2
(45) Date of Patent: Jun. 2, 2026

(54) ELECTROSEISMIC INTEGRATED MONITORING METHOD AND SYSTEM BASED ON ELECTROSTRICTIVE MATERIAL

(71) Applicant: Central South University, Changsha (CN)

(72) Inventors: Diquan Li, Changsha (CN); Qiaoxun Zhang, Changsha (CN); Jishan He, Changsha (CN); Qiyun Jiang, Changsha (CN)

(73) Assignee: Central South University, Changsha (CN)

( * ) Notice: Subject to any disclaimer, the term of this patent is extended or adjusted under 35 U.S.C. 154(b) by 243 days.

(21) Appl. No.: 18/692,213

(22) PCT Filed: Aug. 12, 2022

(86) PCT No.: PCT/CN2022/112108
§ 371 (c)(1),
(2) Date: Mar. 14, 2024

(87) PCT Pub. No.: WO2023/040535
PCT Pub. Date: Mar. 23, 2023

(65) Prior Publication Data
US 2024/0385347 A1 Nov. 21, 2024

(30) Foreign Application Priority Data

Sep. 17, 2021 (CN) .......................... 202111090102.3

(51) Int. Cl.
*G01V 11/00* (2006.01)
(52) U.S. Cl.
CPC ...... *G01V 11/007* (2013.01); *G01V 2210/646* (2013.01)

(58) Field of Classification Search
CPC .......................... G01V 11/007; G01V 2210/646
See application file for complete search history.

(56) References Cited

U.S. PATENT DOCUMENTS 10,254,424 B1 4/2019 Pollock et al.
2011/0088462 A1 4/2011 Samson et al.
(Continued)

FOREIGN PATENT DOCUMENTS

CN 102099545 A * 6/2011 ............... G01V 3/24
CN 105785475 A 7/2016
(Continued)

OTHER PUBLICATIONS

Chinese First Office Action for Chinese Application No. CN202111090102.3, dated Mar. 17, 2022, 13 pages with translation.
(Continued)

*Primary Examiner* — Abdallah Abulaban
(74) *Attorney, Agent, or Firm* — TraskBritt

(57) ABSTRACT

An electroseismic integrated monitoring method comprises: transmitting a current signal including at least one of: a multi-frequency current signal or a single-frequency current signal, the frequency of the current signal being determined according to a proppant, and the proppant performs telescopic vibration under excitation of the current signal at a predetermined frequency. An acoustic wave signal received by a seismic sensor. The acoustic wave signal is an acoustic wave signal generated for the current signal to excite the proppants to perform telescopic vibration. A vibration position of the proppant at a fracturing layer is determined according to the acoustic wave signal. The vibration position is used to determine a basis for propped fracture characteristics. An electrostrictive material is used as the proppant, so that the position of the proppant can be monitored by means of microseism.

10 Claims, 2 Drawing Sheets

Vertical well/Deviated well monitoring

(56)     References Cited

U.S. PATENT DOCUMENTS

| | | | |
|---|---|---|---|
| 2013/0154846 | A1 | 6/2013 | Mangione et al. |
| 2015/0107830 | A1 | 4/2015 | Ersoz et al. |
| 2016/0320518 | A1 | 11/2016 | Mangione |
| 2017/0097431 | A1 | 4/2017 | Mckenna et al. |

FOREIGN PATENT DOCUMENTS

| | | | |
|---|---|---|---|
| CN | 109681181 | A | 4/2019 |
| CN | 113625367 | A | 11/2021 |

OTHER PUBLICATIONS

Chinese Second Office Action for Chinese Application No. CN202111090102.3, dated Jun. 2, 2022, 13 pages with translation.
International Search Report for International Application No. PCT/CN2022/112108, mailed Oct. 25, 2022, 4 pages.
International Written Opinion for International Application No. PCT/CN2022/112108, mailed Oct. 25, 2022, 8 pages.
Notification to Grant Patent Right for Invention received for Chinese Patent Application No. 202111090102.3, mailed on Aug. 3, 2022, 3 pages (2 pages of English Translation and 1 page of Original Document).

\* cited by examiner

Vertical well/Deviated well monitoring

Horizontal well monitoring

S1: laying out field sources: including a power generator, a signal controller, and two power supply electrodes A and B, where the electrode A is connected to a fracturing well, and provides multi-frequency or single frequency signals to conductive proppant injected during a fracturing procedure S2: a monitoring system: seismic sensors are buried at ground monitoring points around a well field, a processing device is tested, and a communication device is ensured to operate normally S3: the monitoring system is ensured to work normally, the sensors receive acoustic signals generated by vibration of the proppant caused by the current during the fracturing procedure, and send the acoustic signals to the processing device through a communication system S4: the processing device accurately locates a vibration position of the proppants in a fracturing layer through microseismic events based on the acoustic signals of the different monitoring points, and an effective propped fracture may be accurately identified

FIG. 3

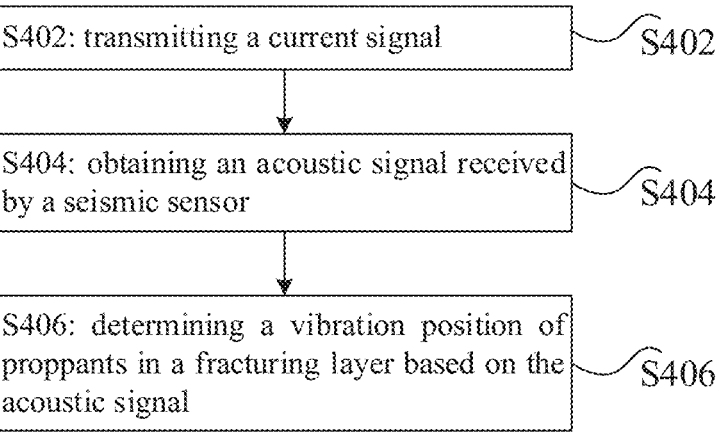

S402: transmitting a current signal                          S402

S404: obtaining an acoustic signal received by a seismic sensor                          S404

S406: determining a vibration position of proppants in a fracturing layer based on the acoustic signal                          S406

ELECTROSEISMIC INTEGRATED MONITORING METHOD AND SYSTEM BASED ON ELECTROSTRICTIVE MATERIAL

CROSS REFERENCE TO RELATED APPLICATIONS

This application is a national phase entry under 35 U.S.C. § 371 of International Patent Application PCT/CN2022/112108, filed Aug. 12, 2022, designating the United States of America and published as International Patent Publication WO 2023/040535 A1 on Mar. 23, 2023, which claims the benefit under Article 8 of the Patent Cooperation Treaty to Chinese Patent Application Serial No. 202111090102.3, filed Sep. 17, 2021.

TECHNICAL FIELD

The present disclosure relates to the field of oil field development, and in particular, to an electroseismic integrated monitoring method and system based on electrostrictive materials.

BACKGROUND

Among traditional technologies for monitoring a hydraulic pressure, microseismic and electromagnetic monitoring technologies are most commonly used. The physical mechanism of microseismic monitoring technology is clear and rock fractures can be identified, but the spread range of liquid cannot be determined, nor can the effective propped fractures be identified. The physical mechanism of electromagnetic monitoring technology is also clear and the spread range of liquid can be identified, but the extension pattern of the fracture network cannot be identified, nor can the effective propped fractures be determined. The reason why neither microseism nor electromagnetic monitoring technologies can identify the effective propped fractures is that it is difficult to monitor a proppant.

Microseism monitors microseismic events caused by stress field changes during fracturing, the liquid may not arrive at the position of the positioning event, and the proppant may not arrive at the position where the liquid arrives. Therefore, the microseismic volume of stimulation is much larger than the effective propped volume. It is difficult for the electromagnetic monitoring technology to identify low content of proppant.

In summary, traditional geophysical technologies cannot accurately determine proppant distribution, let alone monitor effective propped fractures.

BRIEF SUMMARY

Embodiments of the present disclosure provide an electroseismic integrated monitoring method and system based on electrostrictive materials, which at least solve the problem of high difficulty in monitoring proppants in traditional hydraulic fracturing monitoring technologies.

An embodiment of the present disclosure provides an electroseismic integrated monitoring method based on electrostrictive materials, including:

transmitting a current signal, where the current signal includes a multi-frequency current signal, a frequency of the multi-frequency current signal is determined based on proppants, where the proppants make stretching vibration under excitation of a current signal in a predetermined frequency, the proppants are of multiple types, and different types of the proppants make stretching vibration under excitation of current signals in different frequencies; injecting proppants with different frequency characteristics to different fracturing layer positions in a same well, and monitoring multiple layer positions simultaneously by providing the multi-frequency current signal;

obtaining an acoustic signal received by a seismic sensor, where the acoustic signal is generated when the proppants make stretching vibration under excitation of the current signal;

determining a vibration position of the proppants in a fracturing layer based on the acoustic signal, where the vibration position is used to determine a propped fracture characteristic;

making statistics for an energy of multiple microseismic events, where the microseismic events are generated when the proppants make stretching vibration under excitation of the current signal; and obtaining a three-dimensional spatial distribution form of the proppants based on a statistical result.

In an embodiment, transmitting the current signal includes: transmitting the current signal to power supply electrodes after a signal controller generates the current signal, where a first electrode in the power supply electrodes is connected to a fracturing well, and a second electrode in the power supply electrodes is separated from the first electrode by a predetermined distance.

In an embodiment, the seismic sensor is a plurality of seismic sensors buried in ground around a well field of the fracturing well.

In an embodiment, the method further includes: during a hydraulic fracturing procedure, obtaining an effective propped fracture based on the statistical result for the energy of the multiple microseismic events; and monitoring temporary plugging diversion and a scale of repeated stimulations, and providing early warning for casing deformation and frac hit.

In an embodiment, the method further includes: at an oil field development stage, injecting the proppants together with water or chemicals to an oil well, monitoring a flooding displacement front, and identifying an oil-water boundary, to monitor remaining oil.

An embodiment of the present disclosure further provides an electroseismic integrated monitoring system based on electrostrictive materials, including:

a signal controller, used for transmitting a current signal, where the current signal includes a multi-frequency current signal, a frequency of the multi-frequency current signal is determined based on proppants, the proppants make stretching vibration under excitation of a current signal in a predetermined frequency, the proppants are of multiple types, and different types of the proppants make stretching vibration under excitation of current signals in different frequencies; injecting the proppants with different frequency characteristics to different fracturing layer positions in a same well, and monitoring multiple layer positions simultaneously by providing the multi-frequency current signal;

a processor, used for obtaining an acoustic signal received by a seismic sensor, and determining a vibration position of the proppants in a fracturing layer based on the acoustic signal, where the acoustic signal is generated when the proppants make stretching vibration under excitation of the current signal, and the vibration position is used to determine a basis of a propped fracture characteristic; and the processor is further used for making statistics for an energy of multiple microseismic events, where the microseismic events are generated when the proppants make stretching vibration under excitation of the current signal; and obtaining a three-dimensional spatial distribution form of the proppants based on a statistical result.

In an embodiment, the system further includes power supply electrodes, where the current signal is transmitted to the power supply electrodes after the signal controller generates the current signal, a first electrode in the power supply electrodes is connected to a fracturing well, and a second electrode in the power supply electrodes is separated from the first electrode by a predetermined distance.

In an embodiment, the seismic sensor is a plurality of seismic sensors buried in ground around a well field of the fracturing well.

In an embodiment, the processor is further used for, during a hydraulic fracturing procedure, obtaining an effective propped fracture based on the statistical result for the energy of the multiple microseismic events; and monitoring temporary plugging diversion and a scale of repeated stimulations, and providing early warning for casing deformation and frac hit.

In an embodiment, the processor is further used for, at an oil field development stage, injecting the proppants together with water or chemicals to an oil well, monitoring a flooding displacement front, and identifying an oil-water boundary, to monitor remaining oil.

In the embodiments of the present disclosure, a current signal is transmitted, where the current signal includes at least one of a multi-frequency current signal and a single frequency current signal, the frequency of the current signal is determined based on the proppant, and the proppants make stretching vibration under excitation of the current signal in the predetermined frequency; the acoustic signal received by the seismic sensor is obtained, where the acoustic signal is generated when the proppants make stretching vibration under excitation of the current signal; and the vibration position of the proppant in the fracturing layer is determined based on the acoustic signal, where the vibration position is used to determine the propped fracture characteristic.

In the present disclosure, the advantages of electrical signal frequency characteristics and microseismic positioning events are combined, the passive seismic source of the traditional microseismic monitoring technology is developed to a controllable artificial seismic source signal, and the effective propped fracture can be accurately identified; the effect of repeated stimulations can be evaluated by exciting the proppants with different frequency characteristics to make stretching vibration; and for different fracturing layer positions in a same well, conductive proppants with different frequency characteristics can be injected, and multiple layer positions can be monitored simultaneously by providing the multi-frequency current signal.

BRIEF DESCRIPTION OF THE DRAWINGS

The drawings that constitute a part of this disclosure are used to provide a further understanding of this disclosure. The illustrative embodiments and descriptions of this disclosure are used to elaborate this disclosure and do not constitute an improper limitation of this disclosure.

FIG. 3 is a schematic flowchart of an electroseismic integrated monitoring technology based on electrostrictive materials according to an embodiment of the present disclosure.

FIG. 4 is a schematic flowchart of an electroseismic integrated monitoring method based on electrostrictive materials according to an embodiment of the present disclosure.

DETAILED DESCRIPTION

Figure 1:
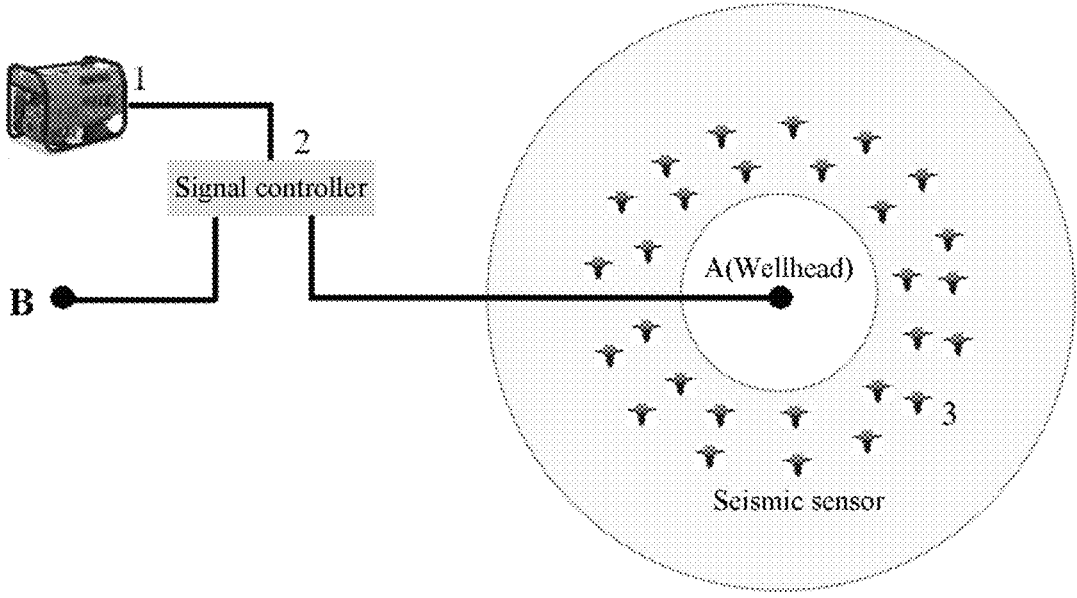
FIG. 1 is a schematic device diagram of an electroseismic integrated vertical/deviated well monitoring based on electrostrictive materials according to an embodiment of the present disclosure.

It should be noted that, the embodiments and features in the embodiments in the present disclosure can be combined without conflicting. The present disclosure is described in detail below with reference to the accompanying drawings and embodiments.

It should be noted that, the steps shown in the flowchart of the accompanying drawings can be executed in a computer system such as a set of computer-executable instructions. Although a logical sequence is shown in the flowchart, the steps shown or described may be performed in different sequences in some cases.

An embodiment of the present disclosure provides an electroseismic integrated monitoring method based on electrostrictive materials. FIG. 4 is a schematic flowchart of an electroseismic integrated monitoring method based on electrostrictive materials according to an embodiment of the present disclosure. As shown in FIG. 4, the procedure includes the following steps.

Step S402: transmitting a current signal, where the current signal includes at least one of a multi-frequency current signal and a single frequency current signal, a frequency of the current signal is determined based on proppants, and the proppants make stretching vibration under excitation of a current signal in a predetermined frequency.

In an embodiment, the proppant may include at least one type of proppant, and different types of the proppants make stretching vibration under excitation of current signals in different frequencies.

The proppants are of many types, proppant particles include ceramic matrixes and functional components, such as piezoelectric materials, carbon nanoparticles, magnetic materials, pyrolytic carbon, conductive graphite, or any combination thereof. In an embodiment, the functional components are substantially distributed throughout the ceramic matrixes.

Step S404: obtaining an acoustic signal received by a seismic sensor, where the acoustic signal is generated when the proppants make stretching vibration under excitation of the current signal.

In this step, the seismic sensor may be a plurality of seismic sensors buried in ground around a well field of a fracturing well.

Step S406, determining a vibration position of the proppants in a fracturing layer based on the acoustic signal, where the vibration position is used to determine a propped fracture characteristic.

The problem of high difficulty in monitoring proppants in traditional hydraulic fracturing monitoring technologies is solved by the above steps, and electrostrictive materials are adopted as proppants, so that the position of the proppants may be monitored by microseism.

The current signal may be transmitted through the electrodes to a corresponding location. In an embodiment, transmitting the current signal may include: transmitting the current signal to power supply electrodes after a signal controller generates the current signal, where a first electrode in the power supply electrodes is connected to a fracturing well, and a second electrode in the power supply electrodes is separated from the first electrode by a predetermined distance.

In an embodiment, statistics may also be taken for energy of multiple microseismic events, where the microseismic events are generated when the proppants make stretching vibration under excitation of the current signal; and a three-dimensional spatial distribution form of the proppants is obtained based on a statistical result.

In an embodiment, during a hydraulic fracturing procedure, an effective propped fracture may be obtained based on the statistical result for the energy of the multiple microseismic events; temporary plugging diversion and a scale of repeated stimulations may be monitored, and early warning for casing deformation and frac hit may be provided.

In an embodiment, at an oil field development stage, the proppants may be injected together with water or chemicals to an oil well, a flooding displacement front is monitored, and an oil-water boundary is identified to monitor remaining oil.

An embodiment of the present disclosure further provides an electroseismic integrated monitoring system based on electrostrictive materials, including:

a signal controller, used for transmitting a current signal, where the current signal includes at least one of a multi-frequency current signal and a single frequency current signal, a frequency of the current signal is determined based on proppants, the proppants make stretching vibration under excitation of a current signal in a predetermined frequency, for example, the proppants are of multiple types, and different types of the proppants make stretching vibration under excitation of current signals in different frequencies; and a processor, used for obtaining an acoustic signal received by a seismic sensor, and determining a vibration position of the proppants in a fracturing layer based on the acoustic signal, where the acoustic signal is generated when the proppants make stretching vibration under excitation of the current signal, and the vibration position is used to determine a basis of a propped fracture characteristic.

The current signal may be transmitted through the electrodes to a corresponding location. That is, the system may further include power supply electrodes, where the current signal is transmitted to the power supply electrodes after the signal controller generates the current signal, a first electrode in the power supply electrodes is connected to a fracturing well, and a second electrode in the power supply electrodes is separated from the first electrode by a predetermined distance.

In an embodiment, the processor is further used for making statistics for an energy of multiple microseismic events, where the microseismic events are generated when the proppants make stretching vibration under excitation of the current signal, and obtaining a three-dimensional spatial distribution form of the proppants based on a statistical result. The processor is further used for, during a hydraulic fracturing procedure, obtaining an effective propped fracture based on the statistical result for the energy of the multiple microseismic events; and monitoring temporary plugging diversion and a scale of repeated stimulations, and providing early warning for casing deformation and frac hit. The processor is further used for, at an oil field development stage, injecting the proppants together with water or chemicals to an oil well, monitoring a displacement front, and identifying an oil-water boundary, to monitor remaining oil.

An embodiment is described below in conjunction with the accompanying drawings. The embodiment provides an electroseismic integrated monitoring technology based on electrostrictive materials, adopting electrostrictive materials as proppants, using a multi-frequency current signal or a single frequency current signal for excitation, and monitoring a position of the proppants by microseism.

The embodiment may be applied to a vertical and/or deviated well. FIG. 1 is a schematic device diagram of an electroseismic integrated vertical/deviated well monitoring based on electrostrictive materials according to an embodiment of the present disclosure. As shown in FIG. 1, a power generator 1 provides power to the signal controller 2 and the power supply electrodes, an electrode A is at a wellhead, an electrode B is separated from the electrode A by a predetermined distance, and a seismic sensor 3 may be provided according to actual situations.

Figure 2:
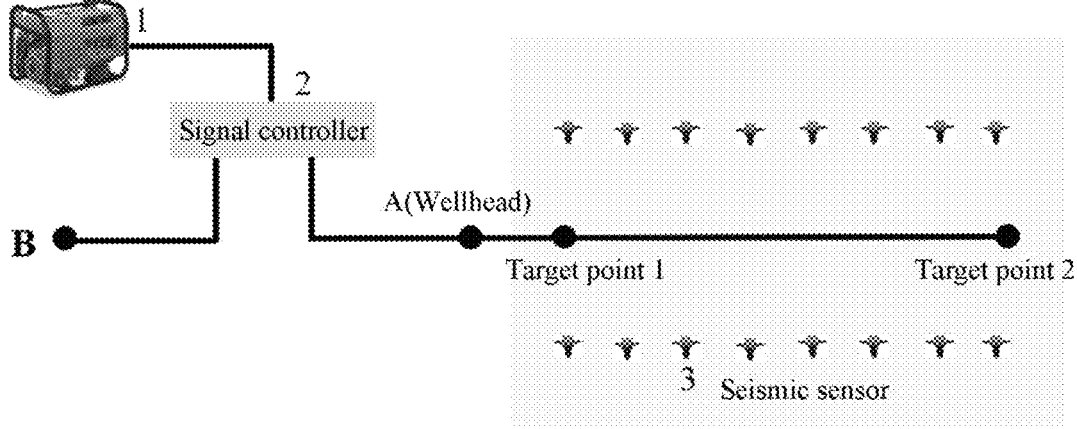
FIG. 2 is a schematic device diagram of an electroseismic integrated horizontal well monitoring based on electrostrictive materials according to an embodiment of the present disclosure.

The embodiment may be applied to a horizontal well. FIG. 2 is a schematic device diagram of an electroseismic integrated horizontal well monitoring based on electrostrictive materials according to an embodiment of the present disclosure. As shown in FIG. 2, a power generator 1 provides power to the signal controller 2 and the power supply electrodes, an electrode A is at a wellhead, and an electrode B is separated from the electrode A by a predetermined distance. There are also two target points, which are a target point 1 and a target point 2, respectively. In FIG. 2, a seismic sensor 3 may be provided according to actual situations.

The embodiment provides an electroseismic integrated monitoring technology based on electrostrictive materials. FIG. 3 is a schematic flowchart of an electroseismic integrated monitoring technology based on electrostrictive materials according to an embodiment of the present disclosure, the monitoring technology includes the following steps:

step S1: laying field sources: including a power generator 1, a signal controller 2, two power supply electrodes A and B, where the power generator 1 provides power, the signal controller 2 transmits a multi-frequency or signal frequency current signal, the multi-frequency or signal frequency current signal excites conductive proppant injected during a fracturing procedure, the power supply electrode A is connected to a fracturing well, and the power supply electrode B is away from the fracturing well;

step S2: a monitoring system: seismic sensors 3 are buried at ground monitoring points around a well field, a processing device is tested, and a communication device is ensured to operate normally;

step S3: the monitoring system is ensured to work normally, the seismic sensors 3 receive acoustic signals generated by vibration of the proppant caused by the current during the fracturing procedure, and send the acoustic signals to the processing device through a communication system; and step S4: the processing device accurately locates a vibration position of the proppants in a fracturing layer through microseismic events based on the acoustic signals of the different monitoring points, and an effective propped fracture may be accurately identified; statistical analysis is performed based on energy magnitudes of massive microseismic events to obtain a three-dimensional spatial distribution form of the proppant.

In the above steps, the advantages of electrical signal frequency characteristics and microseismic positioning events are combined, the passive seismic source of the traditional microseismic monitoring mode is developed to a controllable artificial seismic source signal, and the effective propped fracture can be accurately identified.

This monitoring technology utilizes electrical signals to excite the proppants with different frequency characteristics to perform telescopic vibrations, and an effect of repeated stimulations can be evaluated. This monitoring technology may be utilized to inject conductive proppants with different frequency characteristics into different fracturing layers of a same well, and multiple layers may be monitored simultaneously by supplying multi-frequency current signals.

For the hydraulic fracturing procedure, the above embodiment may not only identify effective propped fractures, but also monitor temporary plugging diversion and a scale of repeated stimulations, and in addition, provide early warning for casing deformation and frac hit.

The above embodiment may also be applied to an oil field development stage, where the electrostrictive material is injected together with water or chemicals to an oil well, which may effectively monitor a displacement front, identify an oil-water boundary, monitor remaining oil, and improve an oil field recovery rate.

In summary, the embodiment provides a technical idea and technical possibility for the problems of casing deformation early warning, frac hit identification, temporary plugging diversion, and repeated reformation monitoring during the fracturing procedure, and for the problems of monitoring the displacement front, oil-water boundary, and remaining oil during the injection and production process of oil field development.

In an embodiment, an electronic device is provided, including a memory and a processor, a computer program is stored in the memory, and the processor is configured to execute the computer program to perform the method in the above embodiments.

The above program may run in the processor, or may also be stored in the memory (also known as computer-readable media), the computer-readable media includes permanent media, non-permanent media, removable media, and non-removable media, and may be implemented by any mode or technology for storage of information. The information may be computer-readable instructions, data structures, modules of programs, or other data. Examples of computer storage media include, but are not limited to, phase-change random access memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disc (DVD), other optical storage, magnetic tape, magnetic disk storage, other magnetic storage device, or any other non-transmission medium, which may be used to store information that may be accessed by computer devices. As defined thereof, the computer-readable media do not include transitory computer-readable media, such as modulated data signals and carrier waves.

The computer program may also be loaded on computers or other programmable data processing devices, so that a series of operating steps are performed on the computers or other programmable devices to realize the computer-implemented processes, thereby the instructions that execute on the computers or other programmable devices provide steps for implementing the functions specified in a process or processes in the flowcharts and/or in a block or blocks in the block diagrams, and correspondingly different steps may be implemented through different modules.

The above are embodiments of the present disclosure, which are not intended to limit the scope of the invention as defined by the claims.

What is claimed is:

1. An electroseismic integrated monitoring method based on electrostrictive materials, comprising:

transmitting a current signal, wherein the current signal comprises a multi-frequency current signal, frequencies of the multi-frequency current signal being predetermined based on proppants, the proppants undergoing stretching vibration under excitation of the current signal at the predetermined frequencies, the proppants being of multiple types, and different types of the proppants undergoing stretching vibration under excitation of current signals at different predetermined frequencies;

injecting the proppants with different frequency characteristics to different fracturing layer positions in a same well, and monitoring multiple layer positions simultaneously by providing the multi-frequency current signal;

obtaining an acoustic signal received by a seismic sensor, wherein the acoustic signal is generated when the proppants undergo stretching vibration under excitation of the current signal;

determining a vibration position of the proppants in a fracturing layer based on the acoustic signal, wherein the vibration position is used to determine a propped fracture characteristic;

making statistics for an energy of multiple microseismic events, wherein the microseismic events are generated when the proppants undergo stretching vibration under excitation of the current signal;

obtaining a three-dimensional spatial distribution form of the proppants based on a statistical result; and wherein the proppant comprises ceramic matrixes and functional components distributed through the ceramic matrixes, the functional components comprising one or any combination of piezoelectric materials, carbon nanoparticles, magnetic materials, pyrolytic carbon, or conductive graphite.

2. The method of claim 1, wherein transmitting the current signal comprises:

transmitting the current signal to power supply electrodes after a signal controller generates the current signal, wherein a first electrode of the power supply electrodes is connected to a fracturing well, and a second electrode of the power supply electrodes is separated from the first electrode by a predetermined distance.

3. The method of claim 2, wherein the seismic sensor comprises a plurality of seismic sensors buried in ground around a well field of the fracturing well.

4. The method of claim 1, further comprising:

during a hydraulic fracturing procedure, obtaining an effective propped fracture based on the statistical result for the energy of the multiple microseismic events; and monitoring temporary plugging diversion and a scale of repeated stimulations, and providing early warning for casing deformation and frac hit.

5. The method of claim 1, further comprising:

injecting the proppants together with water or chemicals to an oil well, monitoring a displacement front, and identifying an oil-water boundary, to monitor remaining oil.

6. An electroseismic integrated monitoring system based on electrostrictive materials, comprising:

a signal controller, used for transmitting a current signal, wherein the current signal comprises a multi-frequency current signal, frequencies of the multi-frequency current signal being predetermined based on proppants, the proppants undergoing stretching vibration under excitation of the current signal at the predetermined frequencies, the proppants being of multiple types, and different types of the proppants undergoing stretching vibration under excitation of the current signal at different predetermined frequencies;

proppant injected to a well, the proppant having different frequency characteristics and being injected to different fracturing layer positions within the well;

a seismic sensor;

a processor configured to obtain an acoustic signal received by the seismic sensor, monitor multiple fracturing layer positions due to the multi-frequency current signal, determine a vibration position of the proppants in a fracturing layer based on the acoustic signal, wherein the acoustic signal is generated when the proppants undergo stretching vibration under excitation of the current signal, and determine a basis of a propped fracture characteristic using the determined vibration position;

wherein the processor is further configured to make statistics for an energy of multiple microseismic events, wherein the microseismic events are generated when the proppants undergo stretching vibration under excitation of the current signal, the processor further configured to generate a three-dimensional spatial distribution form of the proppants based on a statistical result; and wherein the proppant comprises ceramic matrixes and functional components distributed throughout the ceramic matrixes, the functional components comprising one or any combination of piezoelectric materials, carbon nanoparticles, magnetic materials, pyrolytic carbon, or conductive graphite.

7. The system of claim 6, further comprising:

power supply electrodes, wherein the current signal is transmitted to the power supply electrodes after the signal controller generates the current signal, a first electrode in the power supply electrodes being connected to a fracturing well, and a second electrode in the power supply electrodes being separated from the first electrode by a predetermined distance.

8. The system of claim 7, wherein the seismic sensor comprises a plurality of seismic sensors buried in ground around a well field of the fracturing well.

9. The system of claim 6, wherein, the processor is further configured to, during a hydraulic fracturing procedure, obtain an effective propped fracture based on the statistical result for the energy of the multiple microseismic events, monitor temporary plugging diversion and a scale of repeated stimulations, and provide early warning for casing deformation and frac hit.

10. The system of claim 6, wherein, the processor is further configured to, after injecting the proppants together with water or chemicals to an oil well, monitor a displacement front, identify an oil-water boundary, and monitor remaining oil.

* * * * *